(12) United States Patent
Bergsten et al.

(10) Patent No.: US 6,389,786 B1
(45) Date of Patent: May 21, 2002

(54) BELT DRIVE SYSTEM HAVING A SINGLE DRIVE MOTOR FOR MULTI-BLADED ROTARY CUTTING UNIT FOR MOWER

(75) Inventors: Rex R. Bergsten, Burnsville; Thomas F. Langworthy, Belle Plaine, both of MN (US)

(73) Assignee: The Toro Company, Minneapolis, MN (US)

( * ) Notice: Subject to any disclaimer, the term of this patent is extended or adjusted under 35 U.S.C. 154(b) by 0 days.

(21) Appl. No.: 09/507,313

(22) Filed: Feb. 18, 2000

(51) Int. Cl.$^7$ .................. A01D 34/03; A01D 34/43; A01D 34/64
(52) U.S. Cl. ................ 56/17.5; 56/255; 56/295
(58) Field of Search .............. 56/6, 14.9, 17.5, 56/255, 295, 15.8, 13.5, 17.1

(56) References Cited

U.S. PATENT DOCUMENTS

| | | | |
|---|---|---|---|
| 2,114,095 A | | 4/1938 | Noel |
| 3,601,958 A | * | 8/1971 | Roof .................. 56/6 |
| 3,731,472 A | * | 5/1973 | Kamlukin ............ 56/11.3 |
| 4,084,397 A | * | 4/1978 | McGrath .............. 56/255 |
| 4,304,086 A | * | 12/1981 | Stuchl ................ 56/6 |
| 4,887,420 A | * | 12/1989 | Cerny, Jr. et al. ...... 56/320.2 |
| 4,926,621 A | * | 5/1990 | Torras ................ 56/6 |
| 5,062,259 A | * | 11/1991 | Lipscombe ............ 56/255 |
| 5,303,532 A | | 4/1994 | Phillips |
| 5,465,561 A | * | 11/1995 | Samejima et al. ...... 56/11.8 |
| 5,481,857 A | * | 1/1996 | Umemoto et al. ...... 56/12.6 |
| 5,507,586 A | * | 4/1996 | Myszka ............... 403/365 |

* cited by examiner

Primary Examiner—Robert E. Pezzuto
Assistant Examiner—Árpád Fábián Kovács
(74) Attorney, Agent, or Firm—James W. Miller

(57) ABSTRACT

A riding mower having two side cutting units and a front cutting unit operatively connected to a traction frame. Each side cutting unit can pivot about a substantially vertical axis relative to the traction frame when impact shocks occur on the outer sides of the cutting units. A shock absorber cushions and absorbs such impact shocks, and resists the pivoting motion of the side cutting units, in a bi-directional fashion to be effective during forward or reverse motion of the traction frame. The mower also includes a front cutting unit. The cutting units, both the side cutting units and the front cutting unit, have multiple cutting blades and a single drive motor mounted on the cutting unit for driving all the cutting blades contained on that cutting unit. The drive motor is mounted coaxially on the blade spindle of one of the cutting blades and adjacent blades on the cutting unit are driven by one or more drive belts arranged in straight belt runs. The drive belts are identical in size so that common drive belts can be used on all the cutting units.

15 Claims, 7 Drawing Sheets

BELT DRIVE SYSTEM HAVING A SINGLE DRIVE MOTOR FOR MULTI-BLADED ROTARY CUTTING UNIT FOR MOWER

TECHNICAL FIELD

This invention relates to a rotary cutting unit for a self-propelled mower, such as a riding mower. More particularly, this invention relates to a rotary cutting unit having multiple cutting blades and a shock absorber for bi-directionally absorbing impact shocks on the outer side of the cutting unit.

BACKGROUND OF THE INVENTION

Riding mowers are known for use on golf courses and the like for mowing a relatively wide cutting swath, i.e. a cutting swath in the 8' to 12' range. Such mowers have a traction frame that is self-propelled by a suitable power source, such as an internal combustion engine, carried on the traction frame. A seated operator is also carried on the traction frame for steering and operating the mower.

Mowers of this type often have multiple cutting units attached to the traction frame. Typically, these cutting units include a front cutting unit and two side cutting units. In addition, each cutting unit often includes at least two cutting blades rotatably mounted thereon. It is the combination of multiple cutting units, each having multiple cutting blades, that allows a very wide cutting swath to be cut.

The traction frame often includes a hydraulic traction system comprising a hydraulic pump powered by the engine. This hydraulic pump supplies pressurized fluid to hydraulic drive motors. Certain of these drive motors are operatively connected to at least some of the ground engaging wheels of the traction frame. Other of these drive motors are used to rotate the cutting blades on the cutting units.

In cutting units of the type used on these mowers, the cutting blades typically are not connected to one another by a timing belt, but are driven in an untimed manner by a V-belt. Thus, the cutting blades are arranged in a laterally overlapped, longitudinally staggered relationship. In other words, the orbit of one blade is longitudinally offset relative to the orbit of an adjacent blade, i.e. the orbit of one blade is in front of or behind the orbit of the adjacent blade, which allows the orbits of the two blade to slightly laterally overlap one another. This ensures that the blades cut a swath of grass without leaving an uncut strip of grass between the blades.

Similarly, the cutting units are themselves laterally overlapped and longitudinally offset relative to one another. The side cutting units trail the front cutting unit with the inner sides of the side cutting units laterally overlapping the outer sides of the front cutting unit. Again, this is to ensure that no uncut strip of grass if left between the cutting units.

A single hydraulic motor has been mounted on cutting units of this type to drive all of the cutting blades carried on that cutting unit. This motor has in the past been mounted on the cutting unit in a position which is longitudinally offset from the rotational axis of either blade. A single drive belt has been used extending from a drive pulley on the motor shaft around pulleys on each of the blade spindles to drive the cutting blades. This drive belt has a serpentine configuration as it passes from the motor pulley around the blade pulleys.

The life of the cutting unit drive belts described above is fairly short due to the serpentine belt configuration required to loop the belt around the motor drive shaft and the blade pulleys. This is a disadvantage because the short belt life means that such belts must be replaced more frequently than one would like. Moreover, significant side loads are imposed on the motor in this arrangement, requiring the use of a fairly expensive motor. Thus, there is a need in the art for a cutting blade drive system on cutting units of this type in which belt life is improved and in which side loads on the motor are minimized.

Another problem with cutting units of this type concerns impact shocks on the cutting units which arise during operation of the mower. This problem particularly affects the side cutting units. As the operator drives the mower forwardly or in reverse, it is not uncommon for the outer sides of the side cutting units to hit some obstacle, such as the trunk of a tree, a stake, etc. This is particularly true given the fact that these mowers often operate on golf courses where many such obstacles are present and where the mower is often driven quite close to such obstacles. In addition, this is also particularly true since the cutting swath is wide and it is difficult for the operator to always accurately judge the distance between the outer sides of the side cutting units and upcoming obstacles.

Mowers in the past have attempted to avoid damage from such impact shocks by allowing the side cutting units to yield or move slightly if an impact occurs against the outer side of the cutting unit. However, such units would typically yield only from shocks against the front of the cutting unit. Since these mowers are often operated in reverse, it is just as likely that a impact shock might arise from an impact against the back of the cutting unit. However, in prior art mowers, such impact shocks against the back of the cutting unit were not absorbed or yieldably resisted and could often result in damage to the cutting unit.

SUMMARY OF THE INVENTION

One aspect of this invention relates to a mower which comprises a traction frame capable of movement over the ground. At least one cutting unit is coupled to the frame. The cutting unit has at least two rotary cutting blades rotatably carried thereon for rotation in substantially horizontal cutting planes. Each cutting blade has a blade spindle rotatably journalled in the cutting unit. A single drive motor is carried on the cutting unit for rotating both cutting blades. The drive motor has a motor shaft that is coaxially arranged with one of the blade spindles and is coupled to the one blade spindle for rotating the blade spindle. The one blade spindle also has a first drive pulley coupled thereto. Finally, a drive belt transmits drive from the first drive pulley on the one blade spindle to a second drive pulley on the other blade spindle.

Another aspect of this invention relates to a mower which comprises a traction frame capable of movement over the ground. At least one cutting unit is coupled to the frame. The cutting unit is a side cutting unit operatively connected to the traction frame. The cutting unit can pivot relative to the traction frame about a substantially vertical axis. A shock absorber is provided for bi-directionally absorbing and resisting pivoting of the cutting unit about the vertical axis.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
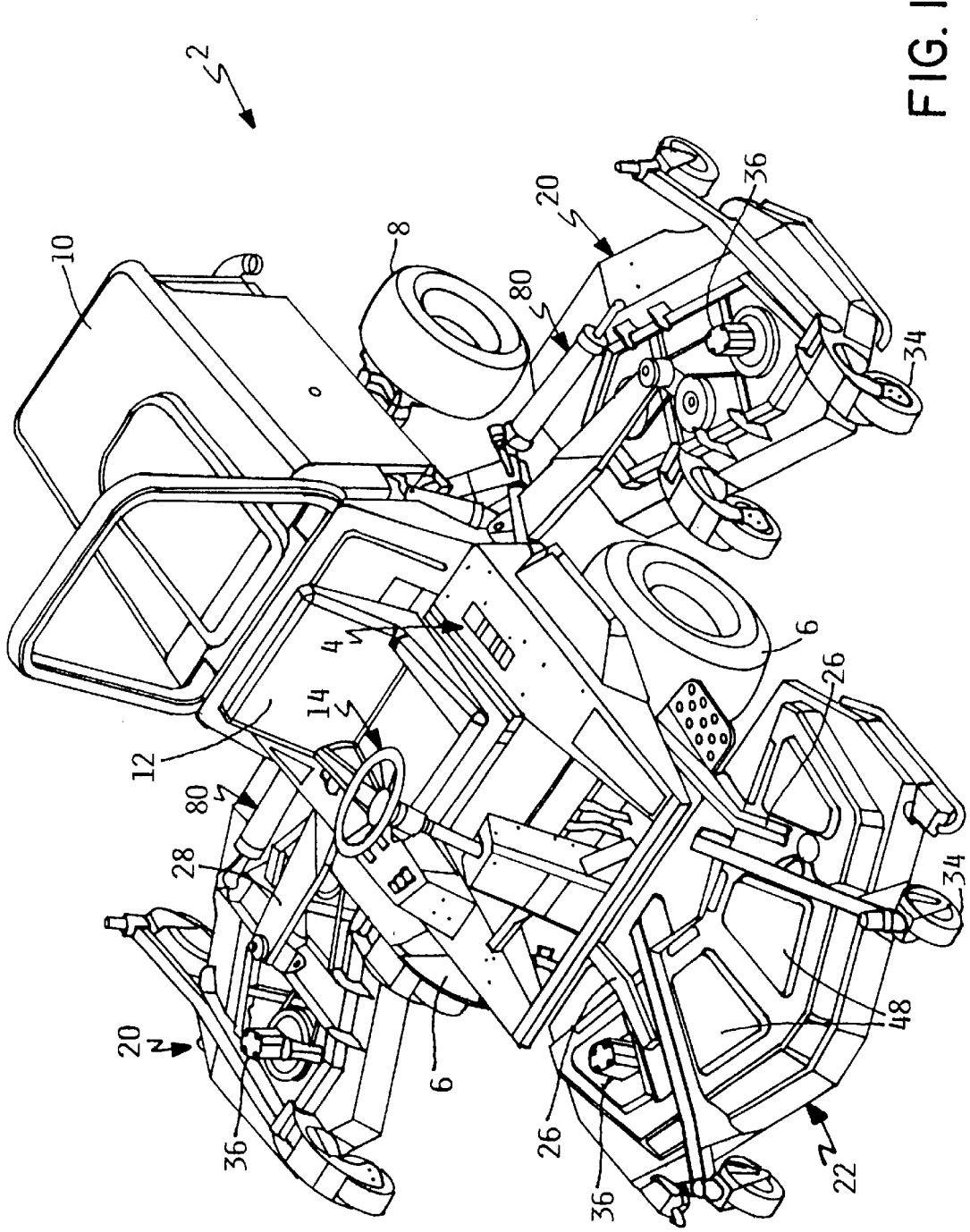
FIG. 1 is a perspective view of a mower according to this invention having a single front cutting unit and two side cutting units, with the belt covers for the side cutting units removed.

This invention relates to a mower illustrated generally as 2. Mower 2 includes a traction frame 4 that is supported for movement over the ground by a pair of front wheels 6 and a pair of rear wheels 8. Traction frame 4 carries a power source (not shown), such as an internal combustion or diesel engine or the like, which is mounted at the rear of traction frame 4 and is enclosed by a hood or shroud 10. Traction frame 4 also carries an operator's seat 12 for carrying an operator. A steering wheel 14 adjacent seat 12 allows the operator to steer and guide mower 2 while it is operating.

A hydraulic system is carried on traction frame 4 which includes a source of pressurized fluid, such as an engine operated hydraulic pump (not shown). Various hydraulic motors are provided on traction frame 4 which utilize this pressurized fluid for powering various components of mower 2.

For example, traction frame 4 is propelled in forward and reverse by a hydraulic traction system comprising two front hydraulic drive motors (not shown) and a rear hydraulic drive motor (not shown). The two front hydraulic drive motors are operatively connected to the two front wheels 6 of traction frame 4. The rear hydraulic drive motor drives the two rear wheels 8 of traction frame 4 through a hydrostatic transmission (not shown) of any suitable design. Thus, in the embodiment of mower 2 disclosed herein, all four wheels 6 and 8 of traction frame 4 are positively driven by the hydraulic traction system. If so desired, the two rear drive wheels 8 could be replaced by a single drive wheel 8 with the rear hydraulic drive motor driving such single drive wheel 8.

Instead of using a hydraulic system, an electrical system could be used instead, e.g. the engine would drive an alternator that, either alone or in concert with a battery pack, would supply electrical energy to a plurality of electrical motors. Moreover, a mixed hydraulic/electrical system could be used with some motors being hydraulic motors and other motors being electrical motors. For example, an electrical traction system could be used to power the drive wheels 6 and 8 while a hydraulic system could be used to power the cutting blades.

Referring to FIG. 1, mower 2 includes two side cutting units 20 attached to traction frame 4 on each side of traction frame 4 and a front cutting unit 22 placed in advance of traction frame 4 and of side cutting units 20. Collectively, cutting units 20 and 22 each mount a plurality of rotatable cutting blades 24 that rotate in substantially horizontal cutting planes. These cutting blades 24 collectively cut a single swath of grass which is approximately 12' wide. Each side cutting unit 20 mounts two rotary cutting blades 24. Front cutting unit 22 mounts three rotary cutting blades 24.

Front cutting unit 22 is pivotally mounted to the front of traction frame 4 by two pivot arms 26 which rotate about a substantially horizontal pivot axis. Thus, front cutting unit 22 can pivot about this pivot axis to follow the ground contour while cutting. In addition, front cutting unit 22 can be pivoted upwardly relative to the frame into a raised transport position by a hydraulic lift cylinder (not shown). This hydraulic lift cylinder acts between traction frame 4 and pivot arms 26 to pivot front cutting unit 22 upwardly into its raised transport position.

Figure 2:
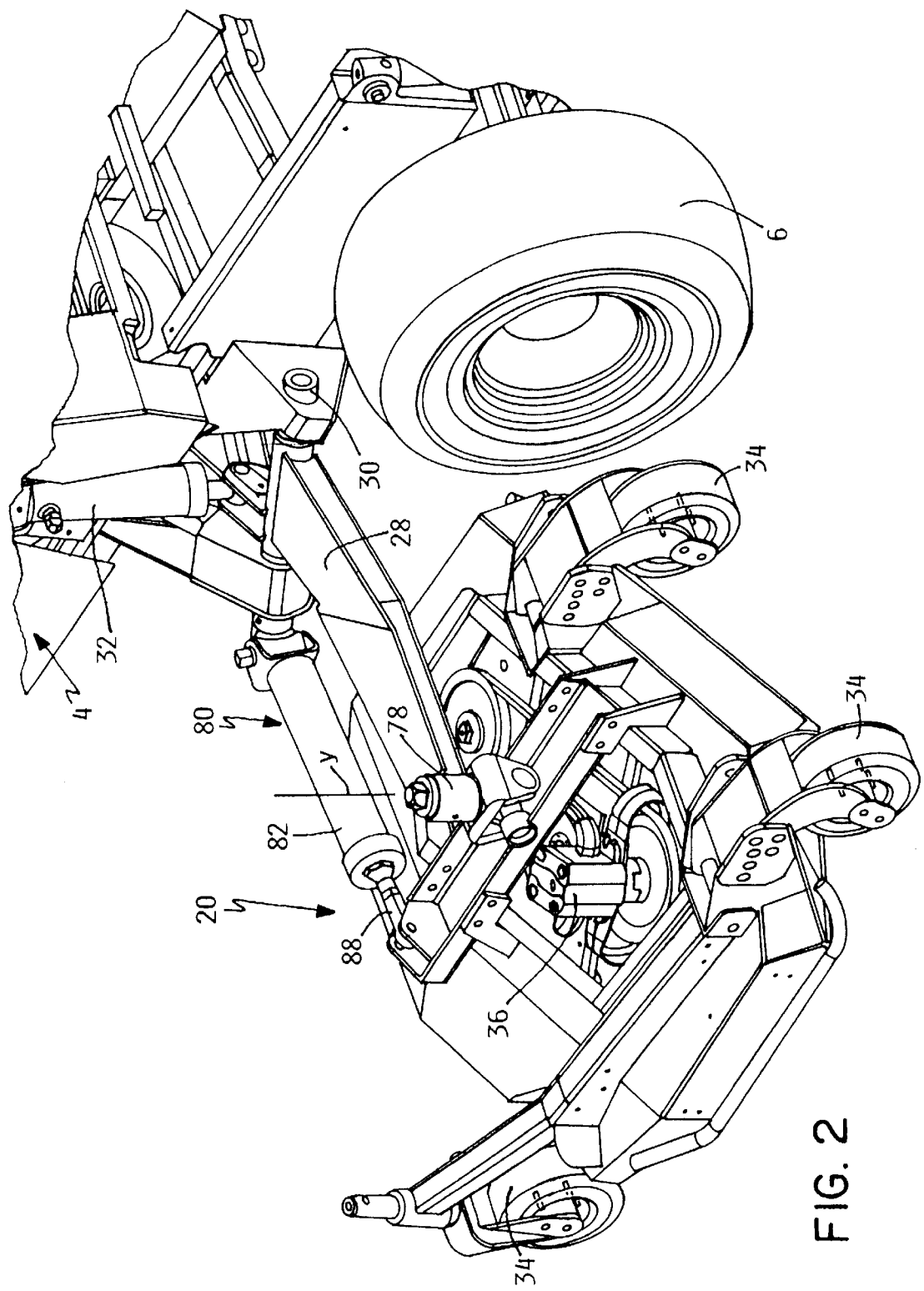
FIG. 2 is an enlarged perspective view of one of the side cutting units of the mower of FIG. 1, the side cutting unit shown attached to the traction frame and with the belt cover removed.

Referring now to FIG. 2, each side cutting unit 20 is pivotally supported on traction frame 4 by a single pivot arm 28 that sticks out to one side of traction frame 4. The inner end of pivot arm 28 is pivotally connected to traction frame 4 by a substantially horizontal or slightly inclined, fore-and-aft facing, pivot rod 30. Another hydraulic lift cylinder 32 acts between traction frame 4 and pivot arm 28 to pivot side cutting unit 20 upwardly about pivot rod 30 into a raised transport position. Thus, both side cutting units 20 and front cutting unit 22 can be raised and lowered between a raised transport position and a lowered cutting position.

In the lowered cutting position, side cutting units 20 and front cutting unit 22 roll over the ground by virtue of various ground engaging support wheels 34 carried on the cutting units in conjunction with the support also provided by pivot arms 26 and 28. During a cutting operation, cutting units 20 and 22 pivot about their pivotal connections to traction frame 4 to follow the ground contours. Such ground following features are well known in the art and need not be further described herein.

Figure 3:
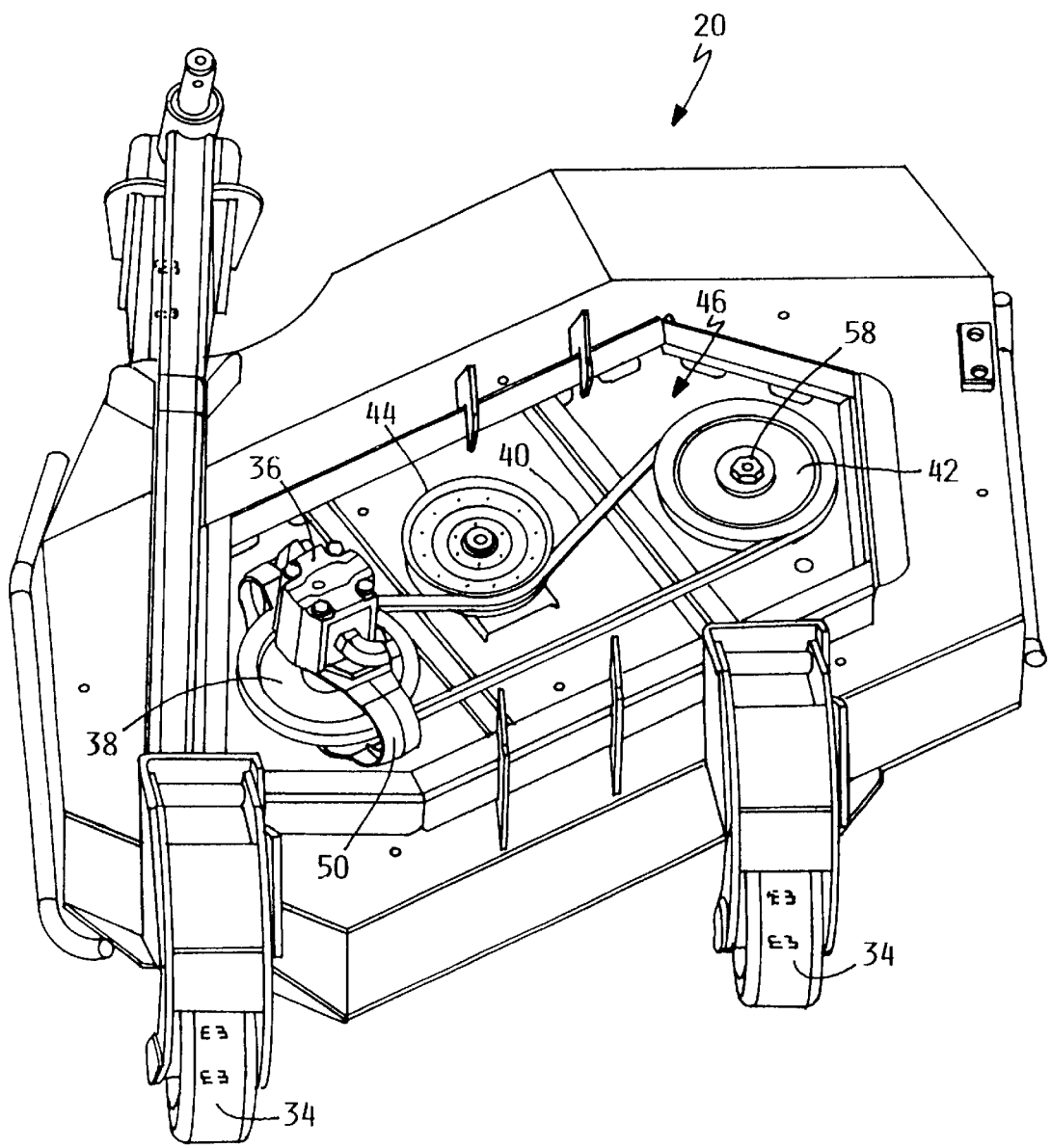
FIG. 3 is an enlarged perspective view of one of the side cutting units of the mower of FIG. 1, the side cutting unit shown detached from the traction frame and with the belt cover removed.

Referring now to FIG. 3, one side cutting unit 20 is shown with its belt cover removed to illustrate the drive to the two rotary cutting blades 24 contained on that unit. A single hydraulic motor 36 powers both cutting blades 24 as will be described in more detail hereafter. A first pulley 38 is coupled to the motor shaft/blade spindle of one cutting blade 24. A simple drive belt 40, namely a V-belt, is arranged in a straight belt run extending to a second pulley 42 coupled to the blade spindle of the other cutting blade 24. An idler pulley 44 tensions the back or return side of drive belt 40.

Figure 5:
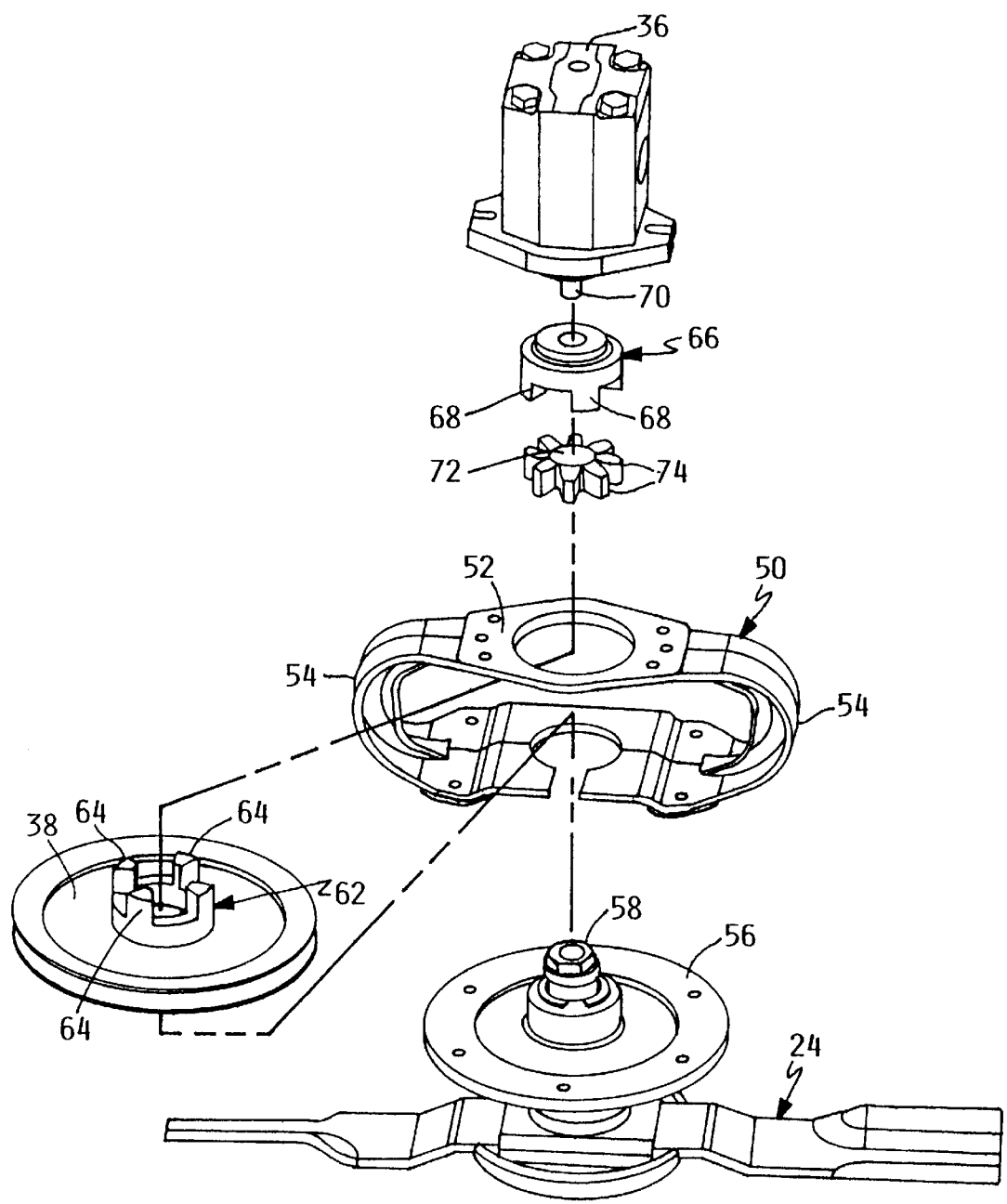
FIG. 5 is a perspective view in exploded form of one of the cutting blades of the cutting unit and the connection between that cutting blade and a drive motor.

Side cutting unit 20 includes a well 46 in which drive belt 40 is normally covered by a belt cover. The belt covers 48 for front cutting unit 22 are shown in place in FIG. 1, but the belt covers for side cutting units 20 are not shown in any of the figures of this patent application for the sake of clarity. Referring to FIGS. 3 and 5, a motor mount 50 is mounted in well 46 with motor mount 50 having a top wall 52 and spaced, downwardly extending arms 54. Hydraulic motor 36 is bolted to top wall 52 of motor mount 50 and motor mount 50 is itself bolted into well 46. When the drive to the cutting blades 24 is assembled and the belt covers are all in place, motor mount 50 is enclosed inside well 46 and hydraulic motor 36 is exposed on top of side cutting unit 20.

Referring further to FIG. 5, each cutting blade 24 in side cutting unit 20 has a mounting hub 56 that is bolted to the underside of well 46 so that cutting blade 24 hangs down beneath well 46 and is received in a downwardly facing cutting chamber (not shown) formed on the bottom of cutting unit 20. Mounting hub 56 is stationary during blade rotation. The blade spindle 58 of each cutting blade 24, however, is rotatable and projects upwardly into well 46 through the underside of well 46. See FIGS. 3 and 4. In fact, each blade spindle 58 extends upwardly into well 46 where it is coupled to a pulley 38 or 42 as will be described hereafter.

Referring again to FIG. 5, the first pulley 38 is located within well 46 between arms 54 of motor mount 50. First pulley 38 includes an upwardly extending, cup-shaped coupler 62 having a plurality of teeth 64. A similarly shaped, but downwardly extending, cup-shaped coupler 66 having a plurality of teeth 68 is secured to the shaft 70 of motor 36 for rotation therewith. The teeth 64 and 68 of the two couplers 62 and 66 interfit with one another. An elastomeric cushioning member 72 includes a plurality of outwardly extending ribs 74. A pair of the ribs 74 on cushioning member 72 fits in the gap between adjacent teeth 64 and 68 on the cup-shaped couplers 62 and 66 to help cushion the drive connection between couplers 62 and 66.

In any event, when motor 36 is assembled to first pulley 38, rotation of motor shaft 70 is transmitted by the upper coupler 66 to the lower coupler 62 on first pulley 38. Rotation of first pulley 38 is then transmitted directly to blade spindle 58 of the first cutting blade, which spindle 58 is coupled to a lower hub on first pulley 38. Thus, in a sense, hydraulic motor 36 on side cutting unit 20 is directly coupled to a first cutting blade 24 for rotating that cutting blade 24 with a first pulley 38 being interposed between motor 36 and the first cutting blade 24.

In addition, the first pulley 38 used beneath hydraulic motor 36 is, of course, part of the drive for rotating the other cutting blade 24 in side cutting unit 20. As noted earlier, a simple drive belt 40 arranged in a single straight belt run extends between the two pulleys 38 and 42 to also transmit drive to the second cutting blade 24 in the cutting unit. The second pulley 42 on the second cutting blade 24 need not have the upwardly extending cup-shaped coupler 62 as it is not connected directly to motor shaft 70.

As can be seen from the drawings, the second cutting blade 24 is longitudinally staggered relative to the first cutting blade 24, i.e. set slightly behind the first cutting blade, so that the orbits of the two blades can laterally overlap one another slightly. This allows the blades 24 in each side cutting deck 20 to cut grass without leaving an uncut strip of grass between the two blades. This is true even though drive belt 40 that transmits drive between the two blades 24 is a simple, smooth V-belt and not a toothed timing belt.

Figure 4:
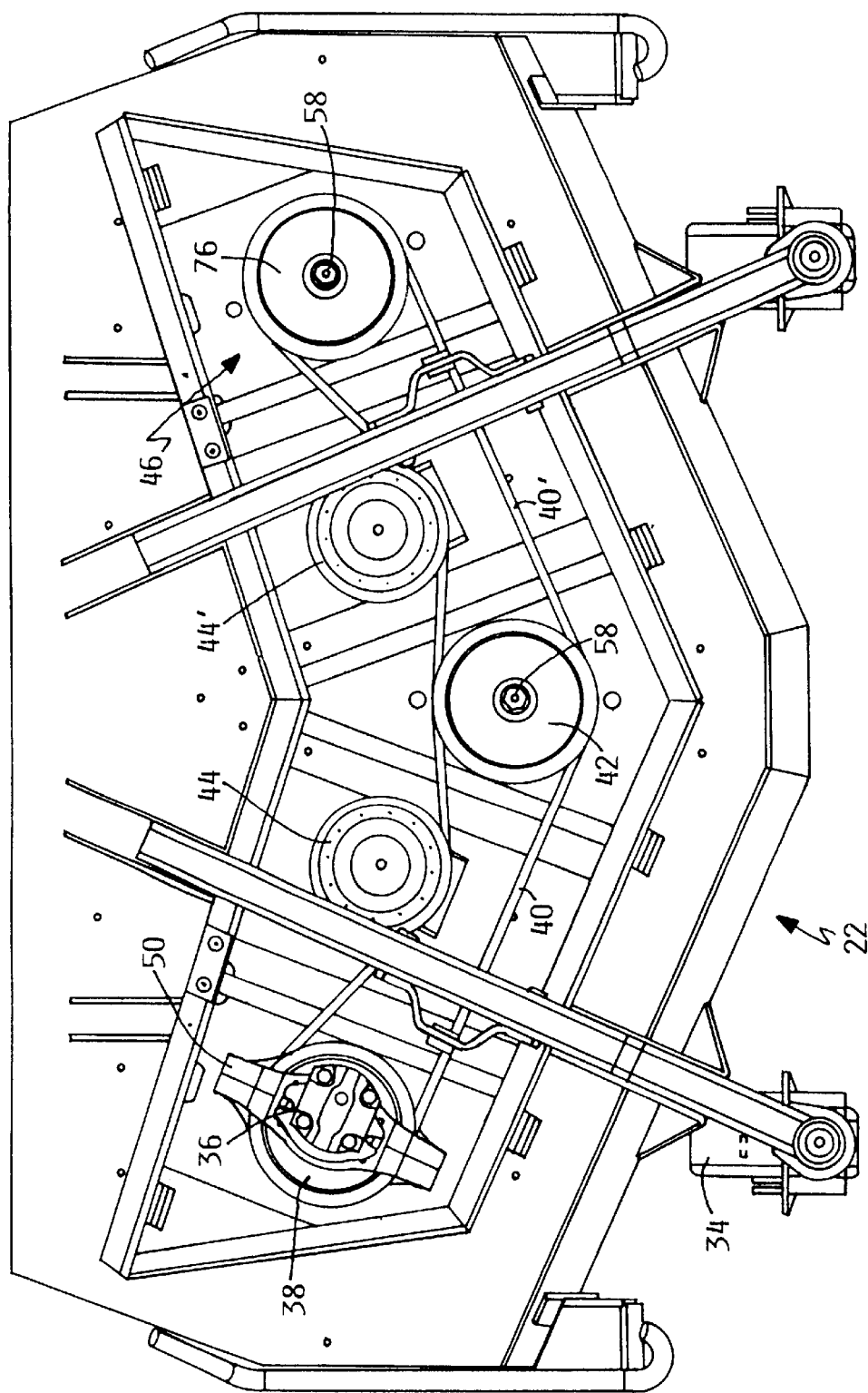
FIG. 4 is a top plan view of the front cutting unit of the mower of FIG. 1, the front cutting unit shown detached from the traction frame and with the belt covers removed.

The same basic drive concept is used to drive the three cutting blades 24 contained in center cutting unit 22. Referring to FIG. 4, a single drive motor 36 is used to drive the first cutting blade 24 arranged on one side of front cutting unit 22 with drive motor 36 being coupled to blade spindle 58 in the same manner as described earlier. First pulley 38 is then effective to drive the center cutting blade 24 on center cutting unit 22 using a single first drive belt 40 having a straight belt run. As before, this first drive belt 40 is tensioned by a single idler pulley 44 engaging the return side of the belt run.

However, the second pulley 42 arranged on blade spindle 58 of the second cutting blade is not a single pulley, but a double pulley comprising two pulleys stacked on top of one another. This allows a second drive belt 40' arranged in a second straight belt run to extend between the double second pulley 42 on the second cutting blade 24 and a third single pulley 76 on the third cutting blade 24. In effect, the use of a simple drive belt 40 arranged in a straight belt run is duplicated in center cutting unit 22. The first drive belt 40 extends in a first straight run between the first and second cutting blades, and the second drive belt 40' extends in a second straight run between the second and third cutting blades. Another idler pulley 44' tensions the second drive belt 40' by engaging the return side of that drive belt 40' as well.

The belt drives in the side and center cutting units 20 and 22 are arranged so that the size of drive belts 40 are all the same. Thus, a simple V-belt 40 of a common and easily available size can be used to drive all the blades 24 in all the cutting units 20 and 22. This belt commonality decreases the expense of manufacturing and servicing mower 2.

In addition, using a hydraulic motor 36 directly coupled to the spindle 58 of one cutting blade 24 with a pulley 38 interposed between drive motor 36 and spindle 58 allows one to use a simple straight belt run between pulleys 38 and 42 on adjacent cutting blades. This is true in both the side and center cutting units 20 and 22. This avoids the use of the more complicated serpentine paths used in belts in prior art mowers. Accordingly, belt life will be increased. In addition, the task of replacing drive belt 40 when a straight belt run is used is much easier and therefore less onerous than in the serpentine paths found in prior art mowers.

Another advantage of mounting drive motor 36 directly above one cutting blade 24 and interposing pulley 38 between drive motor 36 and blade spindle 58 is that the side loads on motor mount 50 and on motor 36 are greatly reduced. A more economical motor 36 can be used since drive motor 36 does not have to bear high side loads. In addition, in the cutting blade drive system disclosed herein, the amount of horsepower transmission through drive belt 40 is reduced, compared to prior art belts, by approximately one half on side cutting units 20 and by approximately one third on front cutting unit 22. Thus, driving one cutting blade spindle 58 directly in the disclosed manner has numerous advantages.

Figure 6:
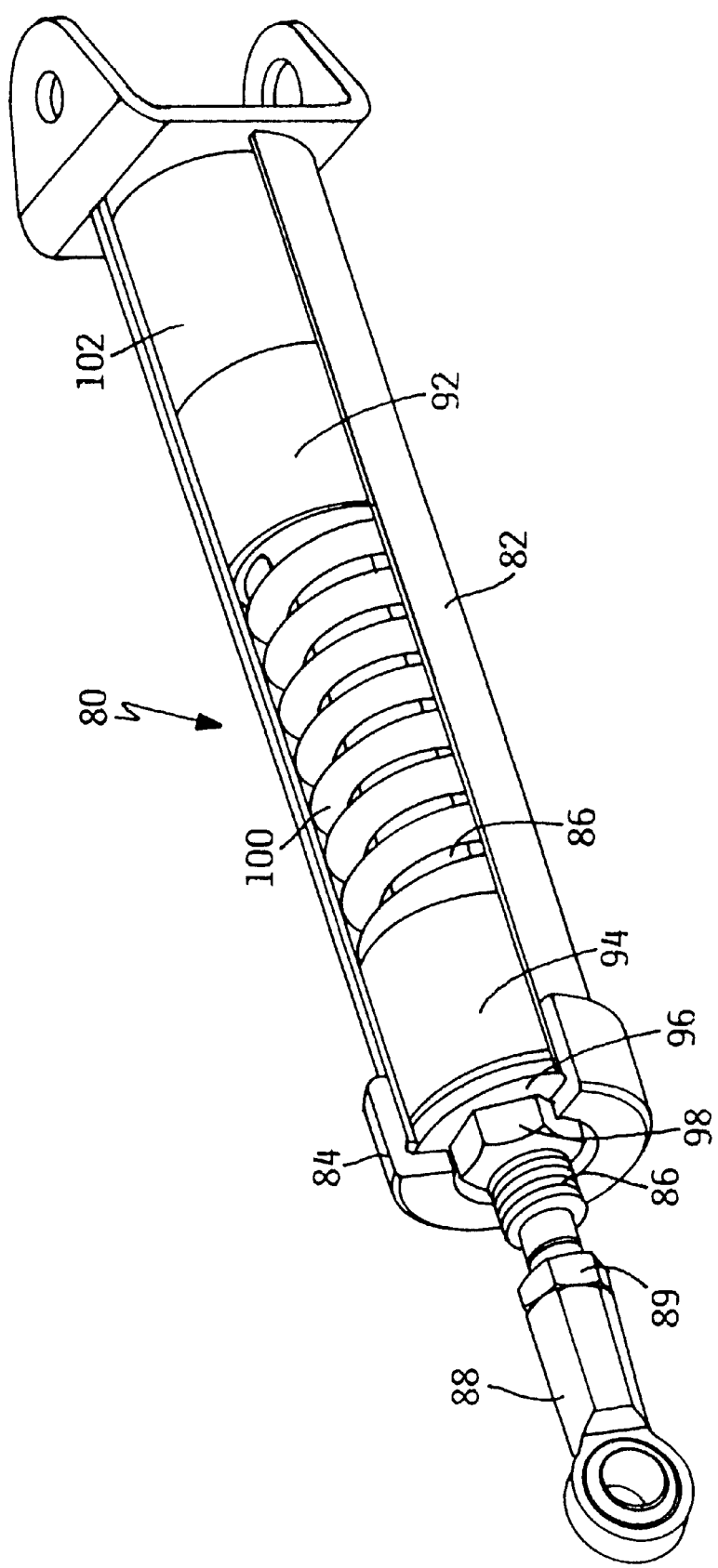
FIG. 6 is a perspective view, partially broken away, of one of the shock absorbers used on each side cutting unit of the mower of FIG. 1 for bi-directionally absorbing impact loads on the outer side of the cutting unit.
Figure 7:
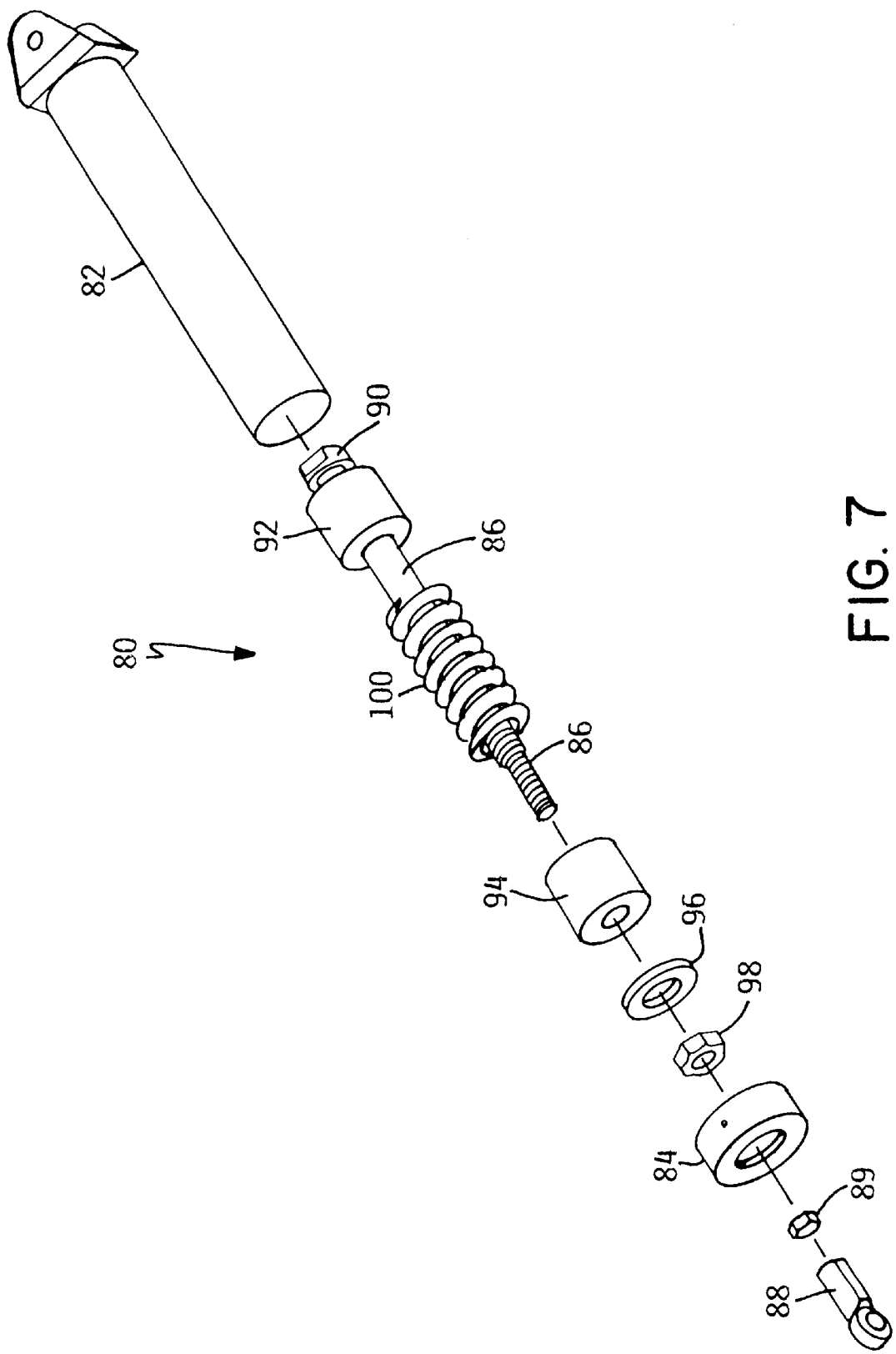
FIG. 7 is a perspective view in exploded form of the shock absorber of FIG. 6.

Turning now to FIGS. 2, 6 and 7, each of side cutting units 20 is not rigidly carried on the end of its associated pivot arm 28. Instead the far or distal end of pivot arm 28 includes a vertical pivot 78 that mounts side cutting unit 20 for rotation or pivoting about a generally vertical pivot axis indicated as y in FIG. 2. Thus, any impacts against side cutting units 20 occurring at or near the outer side of side cutting units 20 will tend to pivot or swing the cutting unit about the pivot axis y. However, this pivoting or swinging motion is damped or resisted bi-directionally by a shock absorber 80.

Shock absorber 80 includes a cylinder 82 having one end pivotally connected to traction frame 4. cylinder 82 is closed at the other end by an end cap 84. An outwardly extending cylinder rod 86 has one end which is attached by an eyebolt 88 and jam nut 89 to side cutting unit 20. The inner end of cylinder rod 86 has an enlarged head 90.

Two cylindrical bushings 92 and 94 are slidably mounted on cylinder rod 86 inside cylinder 82. An inner bushing 92 is received on the inner end of cylinder rod 86 in a normally abutting relationship to the enlarged head 90 on that end of cylinder rod 86. An outer bushing 94 is received around cylinder rod 86 adjacent its outer end. A washer 96 and nut 98 carried on cylinder rod 86 normally abut against outer bushing 94. A spring 100 is also received around cylinder rod 86 and is compressed between the inner and outer bushings 92 and 94. A hollow, sleeve-like spacer 102 fits between inner bushing 92 and the inner end of cylinder 82.

Spring 100 biases shock absorber bi-directionally to oppose impact shocks on side cutting units 20 regardless of the direction of such shocks. When traction frame 4 is moving forwardly and some foreign object impacts against the front of side cutting unit 20 adjacent its outer side, side cutting unit 20 tends to pivot about the vertical axis y such that the rear of side cutting unit 20 tends to swing back towards traction frame 4. This motion moves cylinder rod 86 inwardly relative to cylinder 82, which causes nut 98 to push outer bushing 94 back towards inner bushing 92 against the bias of spring 100. This inward motion of cylinder rod 86 is allowed since enlarged head 90 on the inner end of cylinder rod 86 will be able to move rearwardly back through hollow spacer 102. Accordingly, the impact shock is cushioned and resisted by spring 100. Once the impact shock passes, i.e. side cutting unit 20 deflects upwardly over the foreign object or the foreign object otherwise clears side cutting unit 20, spring 100 will then restore shock absorber 80 to its normal position by pushing outer bushing 94 back into engagement with the outer end of cylinder 82.

If the impact shock occurs against the rear of side cutting unit 20 while traction frame 4 is moving in reverse, side cutting unit 20 now tends to pivot about the axis y such that the front of side cutting unit 20 tends to swing towards traction frame 4. This causes cylinder rod 86 to elongate by moving out of cylinder 82. In this case, enlarged head 90 on cylinder rod 86 will now move inner bushing 92 towards outer bushing 94, to again compress spring 100. This spring compression cushions and absorbs the impact shock just as it did in the first case. In addition, when the shock passes, the compression in spring 100 resets shock absorber 80 to its neutral position by pushing inner bushing 92 back into engagement with hollow spacer 102.

Accordingly, a simple, spring biased shock absorber 80 is disclosed for absorbing and cushioning shocks to side cutting unit 20 in a bi-directional manner. Thus, impact shocks on side cutting units 20 occurring during either forward or reverse motion of traction frame 4 are both resisted and cushioned. This decreases the possibility of damaging side cutting units 20 during operation of traction frame 4.

Each side cutting unit 20 has a shock absorber 80 of this type. Such a shock absorber 80 is not needed on front cutting unit 22 because only side cutting units 20 tend to receive impact shocks from coming too close to and striking various foreign objects.

Various modifications of this invention will be apparent to those skilled in the art. Thus, the scope of the invention shall be limited only by the appended claims.

We claim:

1. A mower, which comprises:
   (a) a traction frame capable of movement over the ground;
   (b) at least one cutting unit coupled to the frame, the at least one cutting unit having at least two rotary cutting blades rotatably carried thereon for rotation in substantially horizontal cutting planes, each cutting blade having a blade spindle rotatably journalled in the cutting unit;
   (c) a single drive motor carried on the cutting unit for rotating both cutting blades, the drive motor having a motor shaft that is coaxially arranged with one of the blade spindles and being coupled to the one blade spindle for rotating the blade spindle, the one blade spindle also having a first pulley coupled thereto;
   (d) a drive belt transmitting drive from the first pulley on the one blade spindle to a second pulley on the other blade spindle; and
   (e) wherein the motor shaft is coupled to the one blade spindle by:
       (i) a downwardly extending, cup-shaped coupler secured to the motor shaft with the downwardly extending coupler having a plurality of spaced, downwardly extending, vertical teeth;
       (ii) an upwardly extending, cup-shaped coupler operatively secured to the one blade spindle with the upwardly extending coupler having a plurality of spaced, upwardly extending, vertical teeth; and
       (iii) wherein the spaced, downwardly extending, vertical teeth on the coupler secured to the motor shaft interfit within the spaced, upwardly extending, vertical teeth on the coupler secured to the one blade spindle to couple the motor shaft to the one blade spindle.

2. The mower of claim 1, wherein the drive belt includes a single drive belt arranged in a straight belt run.

3. The mower of claim 2, further including an idler pulley for tensioning the drive belt.

4. The mower of claim 1, wherein the drive belt comprises a V-belt.

5. The mower of claim 1, wherein the first pulley is interposed between the motor shaft and the blade spindle.

6. The mower of claim 5, wherein the upwardly extending coupler is carried on the first pulley to rotate therewith such that the motor shaft drives the blade spindle through the first pulley.

7. The mower of claim 6, further including an elastomeric cushioning member between the toothed coupling members.

8. The mower of claim 1, wherein the at least one cutting unit is a side cutting unit operatively connected to the traction frame.

9. The mower of claim 1, wherein the drive motor is a hydraulic motor.

10. The mower of claim 1, wherein the at least one cutting unit has three rotary cutting blades carried thereon, wherein the second pulley is a double pulley, and further including a second drive belt for transmitting drive from the second pulley to a third pulley on the spindle of the third cutting blade.

11. The mower of claim 10, wherein the first and second drive belts are identical in size.

12. The mower of claim 10, wherein the at least one cutting unit comprises a center cutting unit connected to a traction frame.

13. The mower of claim 1, wherein the traction frame comprises a riding vehicle.

14. The mower of claim 7, wherein the cushioning member includes a plurality of spaced, horizontally extending ribs with at least one rib being received in each gap between the interfitting vertical teeth on the couplers.

15. The mower of claim 1, wherein the interfitting vertical teeth on the couplers are cushioned from contact with one another by horizontally extending ribs carried on an elastomeric cushioning member.

* * * * *